United States Patent Office 3,376,791
Patented Apr. 9, 1968

3,376,791
HYDRAULIC OSCILLATING POWER TAKE-OFF MECHANISM FOR TRACTORS
Herbert Edward Ashfield, Huddersfield, and Kenneth Dearnley, Newsome, Huddersfield, England, assignors to David Brown Tractors Limited
Filed Nov. 30, 1966, Ser. No. 598,111
Claims priority, application Great Britain, Feb. 6, 1964, 5,014/64, 5,015/64
9 Claims. (Cl. 91—290)

ABSTRACT OF THE DISCLOSURE

A hydraulic mechanism for producing oscillating movement of a mid-mounted tractor power take-off shaft in which the shaft has a pinion mounted on it which engages a rack which forms part of a reciprocating member slidable in a cylinder. The member is caused to oscillate from one end of the cylinder to the other by a supply of oil under pressure which is controlled by movement of a shuttle valve slidable in a bore, the shuttle valve being operated by a feedback of oil under pressure from the cylinder.

---

This application is a continuation of copending application Ser No. 428,766 filed Jan. 28, 1965 for a hydraulic oscillating power take-off mechanism for tractors.

The invention relates to agricultural tractors and the like, and more particularly to agricultural tractors and the like for operating reciprocating implements such as mowing machines of the cutter bar type and spike harrows.

An object of the invention is to effect a substantial reduction in the speed of that end of the pitman of a conventional mowing machine which is remote from the cutter bar, said end being normally mounted on an eccentric pin carried by a flywheel driven by a rotatable power take-off on the tractor. This reduction in speed results in a reduction in the out-of-balance forces with correspondingly lower bearing speeds and reduction in noise.

According to the invention, an agricultural tractor or the like has an oscillatable power take-off shaft.

Figure 1:
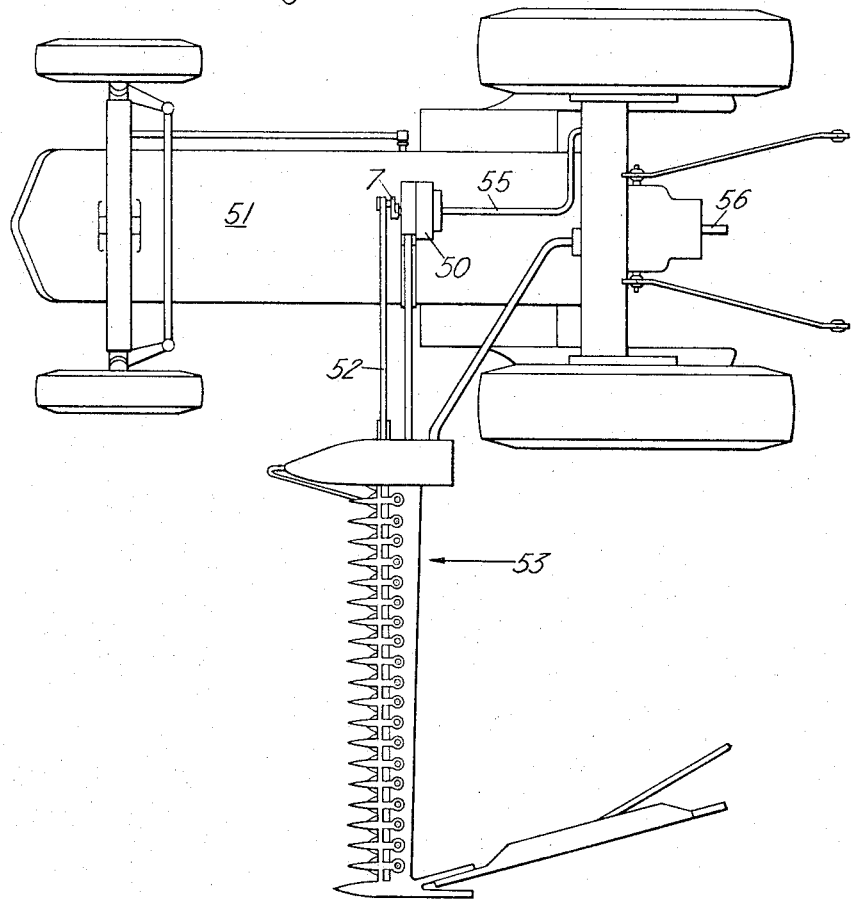
Figure 2:
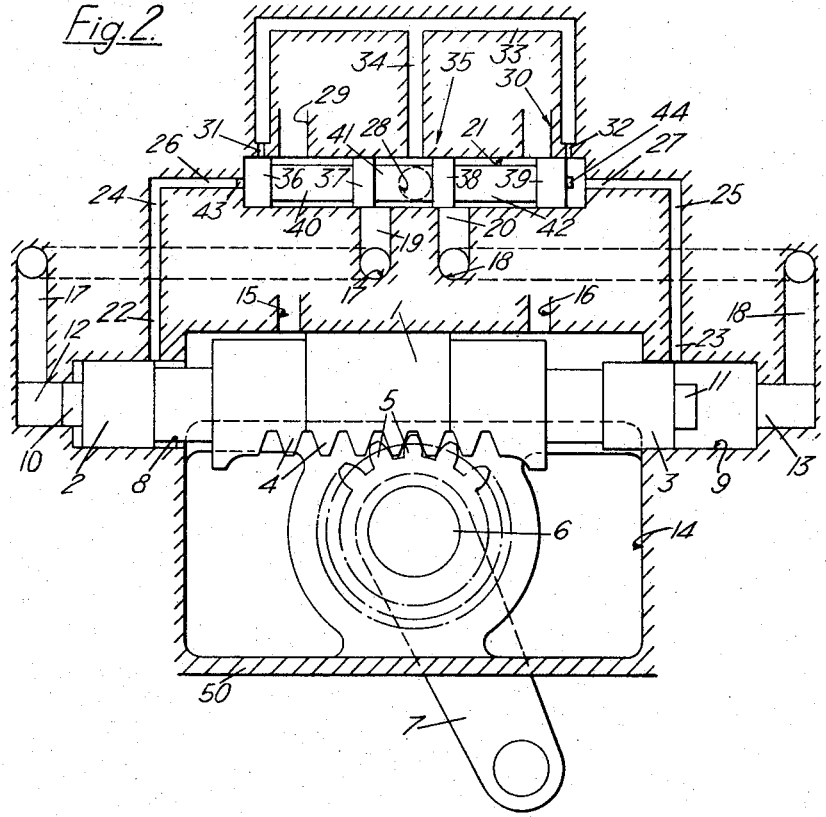

A preferred embodiment of the invention will now be described, by way of example only, with reference to the accompanying drawings, of which:

FIG. 1 is a view on the underside of an agricultural tractor having an oscillatable power take-off shaft according to the invention, operating a mid-mounted mowing machine; and FIG. 2 is a diagrammatic sectional drawing on a larger scale of a hydraulic motor for oscillating the power take-off shaft.

Referring now to the drawings, a hydraulic motor 50 having an oscillatable output shaft 6 is bolted in position underneath the frame 51 of an agricultural tractor between the front and rear wheels thereof. A depending arm 7 is rigidly secured on said shaft and is connected to the pitman 52 of a mid-mounted mowing machine indicated generally at 53. Thus that end of the pitman 52 connected to the depending arm 7 oscillatees instead of rotating in normal manner, and its speed is advantageously reduced to approximately a third of its normal value with corresponding lower bearing speeds and reduction in out-of-balance forces and noise. The motor 50 is actuated by oil supplied under pressure from a hydraulic system on the tractor. An inlet port in the body of said motor communicates, via a non-flexible conduit 55 secured to the exterior of the tractor frame 51, with an outlet for connecting the hydraulic system to auxiliary hydraulically operated equipment, whilst exhaust ports, formed in that face of said body which abuts against the tractor frame 51, communicate directly with the sump of said hydraulic system. Starting and stopping of the hydraulic motor 50 is effected by operating control means for the hydraulic system, said means being located within reach of the driving seat of the tractor. The tractor also has a conventional, mechanically driven, rotatable power take-off shaft 56 at the rear.

The oscillatable output shaft 6 of the motor 50 is provided with gear teeth 5 which mesh with rack teeth 4 formed in a reciprocable member 1 having pistons 2, 3 at its respective ends. The pistons 2, 3 slide in respective co-axial cylinders 8, 9, and have respective co-axial spigots 10, 11. The spigot 10 is adapted to close a port 12 in the end face of the cylinder 8 and the spigot 11 is adapted to close a port 13 in the end face of the cylinder 9. The teeth 4, 5 mesh in a chamber 14 which is full of oil at low pressure and communicates with the sump of the hydraulic system via two ports 15, 16. The ports 12, 13 are connected by respective conduits 17, 18 to radial ports 19, 20 in a bore 21, and respective radial ports 22, 23 in the cylinders 8, 9 are connected by respective passages 24, 25 to co-axial ports 26, 27 in the opposed end faces of the bore 21. Said bore is also provided with a radial supply port 28 communicating directly with the inlet port in the body of the motor, two radial ports 29, 30 communicating with the sump of the hydraulic system, two radial bleed holes 31, 32 leading to a gallery 33, and a radial conduit 34 opening into the bore 21 in the same diametrical plane as the port 28 and also leading to the gallery 33. The bore 21 contains a shuttle valve indicated generally at 35 having four lands 36, 37, 38, 39 separated by portions 40, 41, 42 of reduced diameter. At the respective ends of the shuttle valve 35 there are provided spigots 43 and 44 adapted, respectively, to close the ports 26 and 27.

The hydraulic motor operates as follows:

The reciprocable member 1 is illustrated at the left hand end of its stroke and the shuttle valve 35 is illustrated in the position required to effect movement of the reciprocable member 1 towards the right. This movement is effected by oil under pressure flowing from the supply port 28, around the portion 41 of the shuttle valve 35, and through the port 19 and the conduit 17 to the port 12. As the reciprocable member 1 commences to move, the piston 3 blanks off the radial port 23. This enables the shuttle valve 35 to be locked hydraulically in the position shown by oil under pressure from the supply port 28 acting on its right hand end via the portion 41, conduit 34, gallery 33 and bleed hole 32. Oil escapes to sump from the cylinder 9 through the port 13, the conduit 18 and the port 20, around the portion 42 of the shuttle valve 35, and through the port 30. As the reciprocable member 1 reaches the right hand end of its stroke the spigot 11 closes the port 13 to trap a small quantity of oil in the cylinder 9 and thus prevent the piston 3 contacting the end face of said cylinder. The inner end of the piston 3 uncovers the radial port 23 and connects the right hand end of the bore 21 to sump via the port 27, passage 25, port 23, chamber 14 and ports 15, 16. Simultaneously, the outer end of the piston 2 uncovers the radial port 22 and oil under pressure flows from the cylinder 8 through the passage 24 to the port 26. This causes the shuttle valve 35 to move to the right hand end of the bore 21, the spigot 44 entering the port 27 just prior to the end of this movement so as to cushion hydraulically contact between the right hand ends of the shuttle valve 35 and of the bore 21. The bleed hole 32 is then blanked off by the land 39, and the shuttle valve 35 is in the position required to effect movement of the reciprocable member 1 towards the left. This movement is effected by oil under pressure flowing from the supply port 28, around the portion 41 of the shuttle valve 35, and through the port 20 and the conduit 18 to the port 13. As the reciprocable member 1 commences to move, the piston 2 blanks off the radial port 22. Thus the shuttle valve 35 is locked hydraulically in its right hand position by oil under pressure from the supply port 28 acting on its left hand end via the portion 41, conduit 34, gallery 33 and bleed hole 31. Oil escapes to sump from the cylinder 8 through the port 12, the conduit 17 and the port 19, around the portion 40 of the shuttle valve 35, and through the port 29. As the reciprocable member 1 reaches the left hand end of its stroke the spigot 10 closes the port 12 to trap oil in the cylinder 8 and thus prevent the piston 2 contacting the end face of said cylinder. The inner end of the piston 2 uncovers the radial port 22 and connects the left hand end of the bore 21 to sump via the port 26, passage 24, port 22, chamber 14 and ports 15, 16. Simultaneously, the outer end of the piston 3 uncovers the radial port 23 whereupon oil under pressure flows from the cylinder 9 through the passage 25 to the port 27 and causes the shuttle valve 35 to move to the left hand end of the bore 21. Just prior to the end of this movement the spigot 43 enters the port 26 to cushion hydraulically contact between the left hand ends of the shuttle valve 35 and of the bore 21. The bleed hole 31 is then blanked off by the land 36, and the shuttle valve 35 again occupies the position required to effect movement of the reciprocable member 1 towards the right. That is to say, a complete working cycle of the hydraulic motor has occurred and both the reciprocable member 1 and the shuttle valve 35 are again positioned as shown in the drawing. The next working cycle immediately commences, and the motor continues to operate as long as oil under pressure is supplied to the port 28. The reciprocable member 1 oscillates the output shaft 6 due to the toothed connection 4, 5 therebetween.

The bleed holes 31, 32 are required to prevent all of the oil under pressure escaping from the supply port 28 through the conduit 34 and the gallery 33 to sump at certain times in the working cycle. For example, when the shuttle valve 35 and the reciprocable member 1 are positioned as shown in the drawing, the gallery 33 communicates momentarily with sump via the bleed hole 32, bore 21, port 27, passage 25, port 23, cylinder 9, port 13, conduit 18, and port 20, around the portion 42 of the shuttle valve 35, and through the port 30, but the dimensions of the bleed hole 32 are such that the loss of pressure is negligible. A similar condition occurs momentarily when the shuttle valve 35 and the reciprocable member 1 are both in their extreme right hand positions.

The invention has many advantages over reciprocating implements having built-in hydraulic motors, such as mowing machines of the type having a hydraulic motor on the inner shoe. These require several flexible conduits extending between the tractor and the inner shoe, whereas the present invention does not require any flexible conduits. Furthermore, when built-in hydraulic motors are employed each reciprocating implement requires a separate motor whereas a motor secured to the tractor frame and functioning as a power take-off device can operate any kind of reciprocating implement. The varying lengths of travel of different reciprocating implements can be accommodated by making the depending arm adjustable in length or by providing several interchangeable arms of different lengths.

In a modification the output shaft of the hydraulic motor and the rotatable power take-off shaft are mounted co-axially and clutch means are provided whereby the power take-off shaft may be either rotated by the mechanical drive or oscillated by the hydraulic motor.

We claim:

1. In automatically reversible mechanism having an oscillatable output shaft adapted to be connected to a reciprocable implement part, a hydraulic motor for oscillating said shaft comprising a reciprocable member having a toothed rack and gear connection with said shaft, pistons at opposite ends of said reciprocable member and means defining cylinders slidably receiving said pistons, means defining a bore spaced from said cylinders, an inlet port for introducing hydraulic fluid under pressure into said bore, means defining at least one outlet port opening to said bore, a shuttle valve slidably mounted in said bore for movements between stroke limits at opposite ends of said bore, first conduits connecting the ends of the respective cylinders to spaced ports openings into said bore intermediate the ends of said bore, second conduits connecting the ends of said bore to spaced ports opening into said cylinders inwardly of the respective ends of said cylinders, means on said shuttle valve when the valve is at either limit of its stroke for connecting one of said first conduits to said inlet port to effect displacement of said reciprocable member in one direction and for connecting the other of said first conduits to said outlet port, means actuated by displacement of said reciprocable member to the limit of its stroke in said one direction for connecting said one of said first conduits to that one of the second conduits which is associated with the same cylinder for automatically applying inlet fluid pressure to the end of the shuttle valve to displace said shuttle valve toward its other limit of stroke in said bore, means providing branch passages connecting said inlet port to the respective ends of said bore and being in fluid communication with said inlet port at all times regardless of the position of said valve in said bore, and means under the control of said member for exhausting hydraulic fluid from the bore space at each end of said valve to enable fluid pressure applied through the one of said second conduits at the opposite bore end to displace said valve to its other limit of stroke.

2. In the mechanism defined in claim 1, means on said valve for closing communication between the bore and the branch passage at one end and for opening communication of the bore with the other branch passage at the opopsite end of the bore when said valve is at either end of its stroke in said bore.

3. In the mechanism defined in claim 2, wherein exhaust of hydraulic fluid from the bore spaces at opposite ends of said valve is controlled by said pistons, the initial movement of one of said pistons in said one direction being effective to block exhaust of fluid through said other of said second conduits to hydraulically lock the shuttle valve against displacement during movement of said member through its stroke in said one direction.

4. In the mechanism defined in claim 1, said reciprocable member having projections at opposite ends for extending into and closing said first conduit ports in the cylinder ends whereby movement of said member is brought to a cushioned stop short of abutment of the pistons with the respective cylinder ends.

5. In the mechanism defined in claim 2, said branch passages each having a flow restricting section adjacent its connection into said bore.

6. An automatically reversible hydraulic motor assembly having an oscillatable output shaft and comprising a reciprocable member having a piston at each of its ends and provided with rack teeth meshing with teeth on the output shaft, coaxial cylinders in which the respective pistons are slidable, means defining a bore, a shuttle valve slidable between opposite ends of said bore, inlet and exhaust ports in said bore, first conduits connecting ports in the end walls of the respective cylinders to further ports spaced from the ends of said bore, second conduits connecting the ends of said bore to cylinder wall ports spaced from the respective ends of said cylinders, means on said valve for connecting either one of said first conduits to exhaust and simultaneously connecting the other of said first conduits to inlet, means on said reciprocable member for controlling fluid communication between said other of said first conduits and that one of said second conduits associated with the same cylinder and providing a connection between said other of said first conduits and said one of said second conduits when said member reaches an end of its stroke, and a spigot on each piston adapted to close the port in the end face of its associated cylinder at the end of its exhaust stroke whereby fluid communication between said one of said first conduits and the cylinder associated therewith is blocked when fluid communication is established between said other of said first conduits and said one of said second conduits.

7. An automatically reversible hydraulic motor assembly having an oscillatable output shaft and comprising a reciprocable member having a piston at each of its ends and provided with rack teeth meshing with teeth on the output shaft, coaxial cylinders in which the respective pistons are slidable, means defining a bore, a shuttle valve, slidable between opposite ends of said bore, inlet and exhaust ports in said bore, first conduits connecting the ends of the respective cylinders to further ports spaced from the ends of said bore, second conduits connecting ports in the respective end walls of said bore to cylinder wall ports spaced from the respective ends of said cylinders, means on said valve for connecting either one of said first conduits to exhaust and simultaneously connecting the other of said first conduits to inlet, a connection between said other of said first conduits and that one of said second conduits associated with the same cylinder when said member reaches the end of its stroke, and a spigot at each end of said valve adapted to close the port in the associated end wall of said bore for blocking fluid communication between said one of said first conduits and the cylinder associated therewith when the connection is established between said other of said first conduits and said one of said second conduits.

8. An automatically reversible hydraulic motor assembly having an oscillatable output shaft and comprising a reciprocable member having a piston at each of its ends and provided with rack teeth meshing with teeth on the output shaft, coaxial cylinders in which the respective pistons are slidable, means defining a bore, a shuttle valve slidable between opposite ends of said bore, inlet and exhaust ports in said bore, first conduits connecting the ends of the respective cylinders to further ports spaced from the ends of said bore, second conduits connecting the ends of said bore to cylinder wall ports spaced from the respective ends of said cylinders, means on said valve for connecting either one of said first conduits to exhaust and simultaneously connecting the other of said first conduits to inlet, a connection between said other of said first conduits and that one of said second conduits associated with the same cylinder when the member reaches the end of its stroke, and passage means providing radial bleed holes connected to inlet at the same time and opening into said bore adjacent its respective ends.

9. An automatically reversible hydraulic motor assembly having an oscillatable output shaft and comprising a reciprocable member having a piston at each of its ends and provided with rack teeth meshing with teeth on the output shaft, coaxial cylinders in which the respective pistons are slidable, means defining a bore, a shuttle valve slidable between opposite ends of said bore, inlet and exhaust ports in said bore, first conduits connecting ports in the end walls of the respective cylinders to further ports spaced from the ends of said bore, second conduits connecting ports in the respective end walls of said bore to cylinder wall ports spaced from the respective ends of said cylinders, means on said valve for connecting either one of said first conduits to exhaust and simultaneously connecting the other of said first conduits to inlet, a connection between said other of said first conduits and that one of said second conduits associated with the same cylinder when said member reaches the end of its stroke, a spigot on each piston adapted to close the port in the end wall of its cylinder at the end of its exhaust stroke, a spigot at each end of said valve adapted to close the port in the associated end wall of said bore, and passage means providing radial bleed holes connected to inlet at the same time and opening into said bore adjacent its respective ends.

References Cited

UNITED STATES PATENTS

| 1,222,863 | 4/1917 | Hart | 91—290 |
| 1,584,715 | 10/1922 | Bayles | 91—301 |
| 2,777,427 | 1/1957 | Nichols | 92—136 |
| 3,213,766 | 10/1965 | Carr | 92—135 |

FOREIGN PATENTS 172,243  12/1921  Great Britain.

MARTIN P. SCHWADRON, *Primary Examiner.*

PAUL E. MASLOUSKY, *Examiner.*